United States Patent
Werner et al.

(10) Patent No.: US 7,913,719 B2
(45) Date of Patent: Mar. 29, 2011

(54) TAPE-WRAPPED MULTILAYER TUBING AND METHODS FOR MAKING THE SAME

(75) Inventors: Douglas Werner, Santa Clara, CA (US); Ali Firouzi, Los Altos, CA (US); Mark Munch, Los Altos Hills, CA (US); Zbigniew Cichocki, Newark, CA (US)

(73) Assignee: Cooligy Inc., Mountain View, CA (US)

( * ) Notice: Subject to any disclaimer, the term of this patent is extended or adjusted under 35 U.S.C. 154(b) by 1085 days.

(21) Appl. No.: 11/699,795

(22) Filed: Jan. 29, 2007

(65) Prior Publication Data

US 2007/0193642 A1    Aug. 23, 2007

Related U.S. Application Data

(60) Provisional application No. 60/763,566, filed on Jan. 30, 2006.

(51) Int. Cl.
  *F16L 11/00*    (2006.01)
(52) U.S. Cl. ........ 138/127; 138/137; 138/134; 138/141; 138/133; 138/DIG. 10
(58) Field of Classification Search .................. 138/137, 138/140, 127, 133, 134, DIG. 10, 141
  See application file for complete search history.

(56) References Cited

U.S. PATENT DOCUMENTS

| | | | | |
|---|---|---|---|---|
| 596,062 | A | * | 12/1897 | Firey |
| 2,273,505 | A | * | 2/1942 | Florian ........................... 138/28 |
| 2,600,103 | A | * | 6/1952 | Feck ............................... 119/77 |
| 2,737,341 | A | | 3/1956 | Bitzer ........................... 417/364 |
| 3,365,727 | A | * | 1/1968 | Hoffman ........................... 99/71 |
| 3,491,799 | A | * | 1/1970 | Foll |
| 3,522,413 | A | * | 8/1970 | Chrow .......................... 392/468 |
| 3,524,497 | A | * | 8/1970 | Chu et al. ........................ 165/80 |
| 3,614,967 | A | | 10/1971 | Royston ........................ 138/141 |
| 3,654,988 | A | * | 4/1972 | Clayton, III .................... 165/17 |
| 3,727,029 | A | * | 4/1973 | Chrow .......................... 392/468 |
| 3,800,510 | A | | 4/1974 | Lamond .............................. 96/6 |

(Continued)

FOREIGN PATENT DOCUMENTS

EP    1003006 A1    5/2000

(Continued)

OTHER PUBLICATIONS

"Liquid Flows in Microchannels", Kendra V. Sharp et al., 2002 by CRC Press LLC, 38 pages.

(Continued)

*Primary Examiner* — Patrick F Brinson
(74) *Attorney, Agent, or Firm* — Haverstock & Owens LLP

(57) ABSTRACT

The multi-layer tape wrapped tubing for effectively impeding the diffusion of vapor is made in a continuous in-line process and has three distinct layers: an inner tubing layer, a middle diffusion barrier layer and an outer jacketing layer. The inner tubing layer comes into contact with liquid and vapor. Vapor that might ordinarily diffuse through the tubing is impeded by the diffusion barrier layer. The diffusion barrier layer is a laminate comprising a diffusion barrier film with a very low vapor diffusion rate sandwiched between layers of thermoplastic. The diffusion barrier layer is wrapped around the inner tubing one or more times. The outer jacket layer is a polymeric jacket which is extruded onto the diffusion barrier layer wrapped inner tubing.

24 Claims, 11 Drawing Sheets

U.S. PATENT DOCUMENTS

| | | | |
|---|---|---|---|
| 3,817,321 A * | 6/1974 | von Cube et al. ............ 165/105 |
| 3,823,572 A * | 7/1974 | Cochran, Jr. ................. 62/160 |
| 3,852,806 A * | 12/1974 | Corman et al. ................ 357/82 |
| 3,923,426 A * | 12/1975 | Theeuwes ...................... 417/48 |
| 3,929,154 A * | 12/1975 | Goodwin ...................... 137/344 |
| 3,946,276 A * | 3/1976 | Braun et al. .................. 317/100 |
| 3,993,123 A * | 11/1976 | Chu et al. |
| 4,109,707 A * | 8/1978 | Wilson et al. .................. 165/46 |
| 4,138,996 A * | 2/1979 | Cartland ...................... 126/271 |
| 4,194,559 A * | 3/1980 | Eastman ....................... 165/105 |
| 4,211,208 A * | 7/1980 | Lindner ....................... 126/400 |
| 4,248,295 A | 2/1981 | Ernst et al. ................... 165/105 |
| 4,312,012 A * | 1/1982 | Freiser et al. .................. 357/82 |
| 4,409,079 A | 10/1983 | Miyazaki et al. .......... 73/204.27 |
| 4,450,472 A * | 5/1984 | Tuckerman et al. ............ 357/82 |
| 4,454,379 A * | 6/1984 | Cleveland et al. |
| 4,485,429 A * | 11/1984 | Mittal .......................... 361/386 |
| 4,494,171 A * | 1/1985 | Bland et al. .................. 361/386 |
| 4,497,875 A | 2/1985 | Arakawa et al. ............. 428/620 |
| 4,510,974 A | 4/1985 | Natori et al. ................. 138/137 |
| 4,516,632 A * | 5/1985 | Swift et al. ................... 165/167 |
| 4,559,973 A | 12/1985 | Hane et al. ................... 138/138 |
| 4,561,040 A * | 12/1985 | Eastman et al. .............. 361/385 |
| 4,568,431 A | 2/1986 | Polan et al. .................... 204/13 |
| 4,664,181 A * | 5/1987 | Sumberg ................ 165/104.13 |
| 4,675,783 A * | 6/1987 | Murase ........................ 361/385 |
| 4,758,455 A | 7/1988 | Campbell et al. .............. 428/36 |
| 4,758,926 A * | 7/1988 | Herrell et al. ................ 361/385 |
| 4,791,983 A | 12/1988 | Nicol et al. .................. 165/80.4 |
| 4,866,570 A * | 9/1989 | Porter ......................... 361/382 |
| 4,868,712 A * | 9/1989 | Woodman ................... 361/388 |
| 4,894,709 A * | 1/1990 | Phillips et al. ................. 357/82 |
| 4,896,719 A * | 1/1990 | O'Neill et al. ................ 165/170 |
| 4,908,112 A * | 3/1990 | Pace ......................... 204/299 R |
| 5,009,760 A * | 4/1991 | Zare et al. .................. 204/183.3 |
| 5,016,138 A | 5/1991 | Woodman .................... 361/381 |
| 5,057,908 A | 10/1991 | Weber .......................... 357/81 |
| 5,058,627 A | 10/1991 | Brannen ........................ 138/27 |
| 5,070,040 A | 12/1991 | Pankove ...................... 437/209 |
| 5,072,596 A | 12/1991 | Gilbertson ..................... 62/185 |
| 5,083,194 A | 1/1992 | Bartilson ....................... 357/81 |
| 5,088,005 A | 2/1992 | Ciaccio ........................ 361/385 |
| 5,099,311 A | 3/1992 | Bonde et al. .................... 357/82 |
| 5,099,910 A | 3/1992 | Walpole et al. ............. 165/80.4 |
| 5,125,451 A | 6/1992 | Matthews .................... 165/80.4 |
| 5,131,233 A | 7/1992 | Cray et al. ..................... 62/64 |
| 5,142,970 A | 9/1992 | ErkenBrack ................... 99/472 |
| 5,179,500 A | 1/1993 | Koubek et al. ............... 361/385 |
| 5,182,147 A | 1/1993 | Davis ......................... 428/34.4 |
| 5,199,487 A | 4/1993 | DiFrancesco et al. ........ 165/168 |
| 5,203,401 A | 4/1993 | Hamburgen et al. ........ 165/80.4 |
| 5,218,515 A | 6/1993 | Bernhardt .................... 361/385 |
| 5,219,278 A | 6/1993 | Van Lintel ................ 417/413 R |
| 5,232,047 A | 8/1993 | Matthews .................... 165/163 |
| 5,239,200 A | 8/1993 | Messina et al. ............... 257/714 |
| 5,247,800 A | 9/1993 | Mruzek et al. ................ 62/51.1 |
| 5,263,251 A | 11/1993 | Matthews ................ 29/840.036 |
| 5,269,372 A | 12/1993 | Chu et al. .................... 165/80.4 |
| 5,271,977 A | 12/1993 | Yoshikawa et al. .......... 428/35.9 |
| 5,274,920 A | 1/1994 | Matthews ................ 29/890.039 |
| 5,307,236 A | 4/1994 | Rio et al. ..................... 361/720 |
| 5,309,319 A | 5/1994 | Messina ....................... 361/699 |
| 5,316,077 A | 5/1994 | Reichard ................ 165/104.33 |
| 5,317,805 A | 6/1994 | Hoopman et al. ......... 29/890.03 |
| 5,325,265 A | 6/1994 | Turlik et al. .................. 361/702 |
| 5,336,062 A | 8/1994 | Richter .................... 417/413 A |
| 5,362,530 A * | 11/1994 | Kitami et al. ................ 428/36.2 |
| 5,365,400 A | 11/1994 | Ashiwake et al. ............ 361/752 |
| 5,373,870 A | 12/1994 | Derroire et al. .............. 138/125 |
| 5,380,956 A | 1/1995 | Loo et al. ..................... 174/252 |
| 5,383,340 A | 1/1995 | Larson et al. ............... 62/259.2 |
| 5,388,635 A | 2/1995 | Gruber et al. ............... 165/80.4 |
| 5,398,729 A | 3/1995 | Spurgat ....................... 138/133 |
| 5,398,848 A | 3/1995 | Padamsee .................... 222/94 |
| 5,424,918 A | 6/1995 | Felps et al. ................... 361/704 |
| 5,427,174 A | 6/1995 | Lomolino, Sr. et al. .......... 165/1 |
| 5,436,793 A | 7/1995 | Sanwo et al. ................. 361/689 |
| 5,476,121 A | 12/1995 | Yoshikawa et al. ........... 138/138 |
| 5,488,975 A | 2/1996 | Chiles et al. .................. 138/125 |
| 5,514,906 A | 5/1996 | Love et al. .................... 257/712 |
| 5,534,328 A | 7/1996 | Ashmead et al. ............. 428/166 |
| 5,544,696 A | 8/1996 | Leland ........................ 165/80.4 |
| 5,548,605 A | 8/1996 | Benett et al. ................... 372/36 |
| 5,564,497 A | 10/1996 | Fukuoka et al. .............. 165/152 |
| 5,566,720 A | 10/1996 | Cheney et al. ................ 138/137 |
| 5,575,929 A | 11/1996 | Yu et al. ........................ 216/10 |
| 5,579,828 A | 12/1996 | Reed et al. ..................... 165/83 |
| 5,585,069 A | 12/1996 | Zanzucchi et al. ............ 422/100 |
| 5,641,400 A | 6/1997 | Kaltenbach et al. ........ 210/198.2 |
| 5,646,824 A | 7/1997 | Osashi et al. ................. 361/699 |
| 5,647,429 A | 7/1997 | Oktay et al. ............. 165/104.26 |
| 5,651,414 A | 7/1997 | Suzuki et al. ............ 165/104.14 |
| 5,672,980 A | 9/1997 | Charlton et al. .............. 324/755 |
| 5,692,558 A | 12/1997 | Hamilton et al. ............ 165/80.4 |
| 5,696,405 A | 12/1997 | Weld ............................ 257/714 |
| 5,703,536 A | 12/1997 | Davis et al. .................. 330/289 |
| 5,704,416 A | 1/1998 | Larson et al. ............ 165/104.33 |
| 5,718,956 A | 2/1998 | Gladfelter et al. ............ 428/35.9 |
| 5,727,618 A | 3/1998 | Mundinger et al. ......... 165/80.4 |
| 5,757,070 A | 5/1998 | Fritz ............................. 257/347 |
| 5,774,779 A | 6/1998 | Tuchinskiy ...................... 419/2 |
| 5,800,690 A | 9/1998 | Chow et al. ................... 204/451 |
| 5,801,442 A | 9/1998 | Hamilton et al. ............. 257/714 |
| 5,810,077 A | 9/1998 | Makamura et al. ........... 165/153 |
| 5,830,806 A | 11/1998 | Hudson et al. ................ 438/690 |
| 5,835,345 A | 11/1998 | Staskus et al. ................ 361/699 |
| 5,836,750 A | 11/1998 | Cabuz ........................... 417/322 |
| 5,858,188 A | 1/1999 | Soane et al. .................. 204/454 |
| 5,863,708 A | 1/1999 | Zanzucchi et al. ............ 430/320 |
| 5,869,004 A | 2/1999 | Parce et al. ................... 422/100 |
| 5,870,823 A | 2/1999 | Bezama et al. ................. 29/848 |
| 5,874,795 A | 2/1999 | Sakmoto ...................... 310/156 |
| 5,876,655 A | 3/1999 | Fisher .......................... 264/319 |
| 5,880,017 A | 3/1999 | Schweiebert et al. ........ 438/613 |
| 5,880,524 A | 3/1999 | Xie ............................... 257/704 |
| 5,882,248 A | 3/1999 | Wright et al. ................. 451/285 |
| 5,896,869 A | 4/1999 | Maniscalco ................... 134/1.3 |
| 5,901,037 A | 5/1999 | Hamilton et al. ............. 361/699 |
| 5,909,057 A | 6/1999 | McCormick et al. ......... 257/704 |
| 5,918,469 A | 7/1999 | Cardella ......................... 62/3.7 |
| 5,923,086 A | 7/1999 | Winer et al. .................. 257/713 |
| 5,936,192 A | 8/1999 | Tauchi ......................... 136/203 |
| 5,940,270 A | 8/1999 | Puckett ........................ 361/699 |
| 5,942,093 A | 8/1999 | Rakestraw et al. ........... 204/450 |
| 5,960,866 A | 10/1999 | Kimura et al. ........... 165/104.33 |
| 5,964,092 A | 10/1999 | Tozuka et al. ................... 62/3.7 |
| 5,965,001 A | 10/1999 | Chow et al. .................. 204/600 |
| 5,965,813 A | 10/1999 | Wan et al. ................ 73/204.26 |
| 5,978,220 A | 11/1999 | Frey et al. ..................... 361/699 |
| 5,997,713 A | 12/1999 | Beetz, Jr. et al. .............. 205/124 |
| 5,998,240 A | 12/1999 | Hamilton et al. ............. 438/122 |
| 6,007,309 A | 12/1999 | Hartley ......................... 417/322 |
| 6,010,316 A | 1/2000 | Haller et al. .................. 417/322 |
| 6,012,902 A | 1/2000 | Parce .............................. 417/48 |
| 6,013,164 A | 1/2000 | Paul et al. ..................... 204/450 |
| 6,014,312 A | 1/2000 | Schulz-Harder et al. ..... 361/699 |
| 6,019,882 A | 2/2000 | Paul et al. ..................... 204/450 |
| 6,023,934 A | 2/2000 | Gold ............................. 62/51.1 |
| 6,057,597 A | 5/2000 | Farnworth et al. ............ 257/710 |
| 6,058,014 A | 5/2000 | Choudhury et al. ........... 361/704 |
| 6,068,752 A | 5/2000 | Dubrow et al. ............... 204/604 |
| 6,069,791 A | 5/2000 | Goto et al. ................ 361/679.54 |
| 6,074,717 A * | 6/2000 | Little et al. .................... 428/35.7 |
| 6,084,178 A | 7/2000 | Cromwell ..................... 174/35 |
| 6,090,251 A | 7/2000 | Sundberg et al. ............. 204/453 |
| 6,096,656 A | 8/2000 | Matzke et al. ................ 438/702 |
| 6,100,541 A | 8/2000 | Nagle et al. .................. 250/573 |
| 6,101,715 A | 8/2000 | Fuesser et al. ............. 29/890.03 |
| 6,119,729 A | 9/2000 | Oberholzer et al. ............ 138/27 |
| 6,126,723 A | 10/2000 | Drost et al. ........................ 96/4 |
| 6,129,145 A | 10/2000 | Yamamoto et al. ........... 165/168 |
| 6,131,650 A | 10/2000 | North et al. ................... 165/170 |
| 6,146,103 A | 11/2000 | Lee et al. ........................ 417/50 |
| 6,154,363 A | 11/2000 | Chang ........................... 361/699 |
| 6,159,353 A | 12/2000 | West et al. .................... 204/601 |
| 6,171,067 B1 | 1/2001 | Parce .............................. 417/48 |
| 6,174,675 B1 | 1/2001 | Chow et al. ....................... 435/6 |

| Patent No. | Date | Inventor | Class |
|---|---|---|---|
| 6,176,692 B1 | 1/2001 | Reinartz | 156/292 |
| 6,182,742 B1 | 2/2001 | Tanashashi et al. | 165/104.33 |
| 6,186,660 B1 | 2/2001 | Kopf-Sill et al. | 366/340 |
| 6,210,986 B1 | 4/2001 | Arnold et al. | 438/42 |
| 6,213,156 B1 * | 4/2001 | Niki et al. | 138/126 |
| 6,216,343 B1 | 4/2001 | Leland et al. | 29/890.032 |
| 6,221,226 B1 | 4/2001 | Kopf-Sill | 204/602 |
| 6,227,287 B1 | 5/2001 | Tanaka et al. | 165/80.4 |
| 6,227,809 B1 | 5/2001 | Forster et al. | 417/53 |
| 6,234,240 B1 | 5/2001 | Cheon | 165/80.3 |
| 6,237,641 B1 * | 5/2001 | Niki et al. | 138/126 |
| 6,238,538 B1 | 5/2001 | Parce et al. | 204/600 |
| 6,277,257 B1 | 8/2001 | Paul et al. | 204/450 |
| 6,287,440 B1 | 9/2001 | Arnold et al. | 204/450 |
| 6,293,333 B1 | 9/2001 | Ponnappan et al. | 165/104.26 |
| 6,301,109 B1 | 10/2001 | Chu et al. | 361/700 |
| 6,305,423 B1 | 10/2001 | De Meyer et al. | 138/33 |
| 6,313,992 B1 | 11/2001 | Hildebrandt | 361/700 |
| 6,317,326 B1 | 11/2001 | Vogel et al. | 361/704 |
| 6,321,791 B1 | 11/2001 | Chow | 137/833 |
| 6,322,753 B1 | 11/2001 | Lindberg et al. | 422/102 |
| 6,324,058 B1 | 11/2001 | Hsiao | 361/699 |
| 6,328,075 B1 | 12/2001 | Furuta et al. | 138/143 |
| 6,337,794 B1 | 1/2002 | Agonafer et al. | 361/690 |
| 6,351,384 B1 | 2/2002 | Daikoku et al. | 361/704 |
| 6,385,044 B1 | 5/2002 | Colbert et al. | 361/700 |
| 6,388,317 B1 | 5/2002 | Reese | 257/713 |
| 6,390,140 B2 * | 5/2002 | Niki et al. | 138/127 |
| 6,397,932 B1 | 6/2002 | Calaman et al. | 165/80.4 |
| 6,400,012 B1 | 6/2002 | Miller et al. | 257/712 |
| 6,406,605 B1 | 6/2002 | Moles | 204/601 |
| 6,415,860 B1 | 7/2002 | Kelly et al. | 165/748 |
| 6,416,642 B1 | 7/2002 | Alajoki et al. | 204/451 |
| 6,416,672 B1 | 7/2002 | Midkiff | 210/774 |
| 6,417,060 B2 | 7/2002 | Tavkhelidze et al. | 438/380 |
| 6,424,531 B1 | 7/2002 | Bhatti et al. | 361/704 |
| 6,438,984 B1 | 8/2002 | Novotny et al. | 62/259.2 |
| 6,443,222 B1 | 9/2002 | Yun et al. | 165/104.26 |
| 6,444,461 B1 | 9/2002 | Knapp et al. | 435/283.1 |
| 6,457,515 B1 | 10/2002 | Vafai et al. | 165/80.4 |
| 6,469,893 B1 | 10/2002 | Frutschy et al. | 361/700 |
| 6,495,015 B1 | 12/2002 | Schoeniger et al. | 204/600 |
| 6,496,371 B2 | 12/2002 | Winkel et al. | 361/703 |
| 6,512,509 B1 | 1/2003 | McVicar | 361/703 |
| 6,528,125 B1 | 3/2003 | Jackson et al. | 427/459 |
| 6,533,840 B2 | 3/2003 | Martin et al. | 95/45 |
| 6,537,437 B1 | 3/2003 | Galambos et al. | 204/600 |
| 6,543,521 B1 | 4/2003 | Sato et al. | 165/80.3 |
| 6,553,253 B1 | 4/2003 | Chang | 604/20 |
| 6,562,662 B2 | 5/2003 | Shisshido et al. | 438/125 |
| 6,570,248 B1 | 5/2003 | Ahn et al. | 257/724 |
| 6,572,749 B1 | 6/2003 | Paul et al. | 204/450 |
| 6,577,045 B1 | 6/2003 | Blyablin et al. | 313/311 |
| 6,581,388 B2 | 6/2003 | Novotny et al. | 62/3.7 |
| 6,587,343 B2 | 7/2003 | Novotny et al. | 361/698 |
| 6,588,498 B1 | 7/2003 | Reyzin et al. | 165/104.33 |
| 6,591,625 B1 | 7/2003 | Simon | 62/259.2 |
| 6,632,655 B1 | 10/2003 | Mehta et al. | 435/288.5 |
| 6,643,132 B2 | 11/2003 | Faneuf et al. | 361/700 |
| 6,648,023 B2 * | 11/2003 | Nakakita et al. | 138/127 |
| 6,652,939 B2 | 11/2003 | Smith et al. | 428/35.9 |
| 6,670,699 B2 | 12/2003 | Mikubo et al. | 257/678 |
| 6,678,168 B2 | 1/2004 | Kenny et al. | 361/764 |
| 6,679,315 B2 | 1/2004 | Cosley et al. | 165/80.4 |
| 6,680,044 B1 | 1/2004 | Tonkovich et al. | 423/652 |
| 6,699,791 B2 | 3/2004 | Hofmann et al. | 438/692 |
| 6,741,464 B2 | 5/2004 | Kitano et al. | 361/687 |
| 6,759,109 B2 | 7/2004 | Kanbe et al. | 428/36.8 |
| 6,775,996 B2 | 8/2004 | Cowans | 62/160 |
| 6,787,052 B1 | 9/2004 | Vaganov | 216/57 |
| 6,787,899 B2 | 9/2004 | Rinella et al. | 257/712 |
| 6,863,117 B2 | 3/2005 | Valenzuela | 165/104.26 |
| 6,881,039 B2 | 4/2005 | Corbin et al. | 417/48 |
| 6,882,543 B2 | 4/2005 | Kenny et al. | 361/764 |
| 6,941,975 B2 * | 9/2005 | Wilson et al. | 138/141 |
| 6,972,485 B2 | 12/2005 | Kong et al. | 257/704 |
| 6,977,816 B2 | 12/2005 | Lee et al. | 361/704 |
| 6,986,382 B2 | 1/2006 | Upadhya et al. | 165/80.4 |
| 6,988,515 B2 * | 1/2006 | Oishi et al. | 138/143 |
| 6,988,534 B2 | 1/2006 | Kenny et al. | 165/80.4 |
| 6,988,535 B2 | 1/2006 | Upadhya et al. | 165/80.4 |
| 6,992,891 B2 | 1/2006 | Mallik et al. | 361/704 |
| 6,994,151 B2 | 2/2006 | Zhou et al. | 165/80.4 |
| 7,000,684 B2 | 2/2006 | Kenny et al. | 165/80.4 |
| 7,009,843 B2 | 3/2006 | Lee et al. | 165/704 |
| 7,017,654 B2 | 3/2006 | Kenny et al. | 165/80.4 |
| 7,019,972 B2 | 3/2006 | Kenny et al. | 165/80.4 |
| 7,021,369 B2 | 4/2006 | Werner et al. | 165/104.33 |
| 7,044,196 B2 | 5/2006 | Shook et al. | 165/80.3 |
| 7,052,751 B2 | 5/2006 | Smith et al. | 428/35.9 |
| 7,086,839 B2 | 8/2006 | Kenny et al. | 417/48 |
| 7,104,312 B2 | 9/2006 | Goodson et al. | 165/80.4 |
| 7,117,931 B2 | 10/2006 | Crocker et al. | 165/104.33 |
| 7,124,811 B2 | 10/2006 | Crocker et al. | 165/104.33 |
| 7,143,820 B2 | 12/2006 | Crocker et al. | 165/104.33 |
| 7,156,159 B2 | 1/2007 | Lovette et al. | 165/104.33 |
| 7,178,512 B1 * | 2/2007 | Merten | |
| 7,228,888 B2 | 6/2007 | Eckberg et al. | 165/80.4 |
| 7,243,704 B2 | 7/2007 | Tustaniwskyi et al. | 165/80.2 |
| 7,280,363 B2 | 10/2007 | Reyzin et al. | 361/719 |
| 7,301,773 B2 | 11/2007 | Brewer et al. | 361/719 |
| 7,449,122 B2 | 11/2008 | Corbin et al. | 216/2 |
| 7,462,852 B2 | 12/2008 | Appleby et al. | 250/505.1 |
| 7,539,020 B2 | 5/2009 | Chow et al. | 361/726 |
| 2001/0016985 A1 | 8/2001 | Insley et al. | 435/287.2 |
| 2001/0024820 A1 | 9/2001 | Mastromatteo et al. | 435/287.2 |
| 2001/0044155 A1 | 11/2001 | Paul et al. | 436/161 |
| 2001/0045270 A1 | 11/2001 | Bhatti et al. | 165/80.3 |
| 2001/0046703 A1 | 11/2001 | Burns et al. | 435/303.1 |
| 2001/0055714 A1 | 12/2001 | Cettour-Rose et al. | 429/122 |
| 2002/0011330 A1 | 1/2002 | Insley et al. | 165/133 |
| 2002/0051341 A1 | 5/2002 | Frutschy et al. | 361/700 |
| 2002/0075645 A1 | 6/2002 | Kitano et al. | 361/687 |
| 2002/0080578 A1 | 6/2002 | Xie | 361/679.33 |
| 2002/0121105 A1 | 9/2002 | McCarthy, Jr. et al. | 62/500 |
| 2002/0152761 A1 | 10/2002 | Patel et al. | |
| 2003/0077474 A1 | 4/2003 | Rabinkin et al. | |
| 2003/0121274 A1 | 7/2003 | Wightman | 62/222 |
| 2003/0123228 A1 | 7/2003 | Bhatia et al. | 361/705 |
| 2003/0128508 A1 | 7/2003 | Faneuf et al. | 361/699 X |
| 2004/0026113 A1 | 2/2004 | Bahlmann | |
| 2004/0040695 A1 | 3/2004 | Chesser et al. | 165/104.21 |
| 2004/0070935 A1 | 4/2004 | Tomioka et al. | |
| 2004/0089008 A1 | 5/2004 | Tilton | 62/259.2 |
| 2004/0099410 A1 | 5/2004 | Ghosh | 165/185 |
| 2004/0112571 A1 | 6/2004 | Kenny et al. | 165/80.3 |
| 2004/0112585 A1 | 6/2004 | Goodson et al. | 165/299 |
| 2005/0082666 A1 | 4/2005 | Lee et al. | 257/728 |
| 2005/0211427 A1 | 9/2005 | Kenny et al. | |
| 2005/0214173 A1 | 9/2005 | Facer et al. | 422/100 |
| 2005/0231914 A1 | 10/2005 | Mikubo et al. | 361/699 |
| 2005/0243516 A1 | 11/2005 | Stefanoski et al. | 361/699 |
| 2005/0257532 A1 | 11/2005 | Ikeda et al. | 62/3.7 |
| 2005/0270742 A1 | 12/2005 | Brewer et al. | 361/696 |
| 2006/0056156 A1 | 3/2006 | Long et al. | 361/704 |
| 2006/0102999 A1 | 5/2006 | Tustaniwskyi et al. | 257/688 |
| 2006/0171113 A1 * | 8/2006 | Wu | 361/679.26 |
| 2006/0212359 A1 * | 9/2006 | Yuval | 705/26 |
| 2006/0245987 A1 | 11/2006 | Schmidt | |
| 2007/0042514 A1 * | 2/2007 | Wu et al. | 438/17 |
| 2007/0053161 A1 * | 3/2007 | Giardina et al. | 361/700 |
| 2007/0098143 A1 * | 5/2007 | Thangamani et al. | 378/700 |
| 2007/0152352 A1 | 7/2007 | McKinnell et al. | 252/717 |
| 2007/0201210 A1 | 8/2007 | Chow et al. | 361/704 |
| 2007/0267161 A1 * | 11/2007 | Lin et al. | 165/104.33 |
| 2007/0297136 A1 | 12/2007 | Konshak | 361/699 |
| 2008/0024992 A1 * | 1/2008 | Pflueger | 361/705 |
| 2008/0110963 A1 | 5/2008 | Lin et al. | 8/124.1 |
| 2008/0205003 A1 | 8/2008 | Belady | 361/700 |

FOREIGN PATENT DOCUMENTS

| | | | |
|---|---|---|---|
| JP | 10-099592 | * | 4/1998 |
| JP | 2001-326311 | * | 11/2001 |
| TW | 183247 | * | 5/1995 |
| TW | 491931 | * | 6/2002 |
| TW | 502102 | | 9/2002 |
| TW | 0502102 B | | 9/2002 |

| | | |
|---|---|---|
| TW | 0306614 Y | 2/2007 |
| WO | 2005080901 A1 | 9/2005 |
| WO | 2007006590 A2 | 1/2007 |

OTHER PUBLICATIONS

"Closed Loop Electroosmotic Microchannel Cooling System for CVLSI Circuits", Linan Jang et al, Department of Mechanical Engineering, Stanford University, 27 pages.

"Experimental Measurements of Fluid Flow and Heat Transfer in Microchannel Cooling Passages in a Chip Substrate", Muhammad M. Rahman and Fulin Gui, Thermal Systems Division Mainstream Engineering Corporation, Rockledge, Florida, 685-692.

"Forced Convection Boiling in a Microchannel Heat Sink", Linan Jiang, Man Wong, Member, 2001 IEEE, and Yitshak Zohar, 9 pages. Heat Transfer Characteristics of Water Flowing through Microchannels, X.F. Peng and G.P. Peterson, Copyright 1994 Taylor & Francis, 265-283.

"Nonuniform Temperature Distibution in Electronic Devices Cooled by Flow in Parallel Microchannels", Gad Hetsroni et al., 2001 IEEE, 23 pages.

Thermal-Hydraulic Characteristic of Micro Heat Exchangers, J.H. Wang et al., Energy and Resources Laboratories, Industrial Technology Research Institute Hsinchu, Taiwan, Republic of China, 331-339.

Fabrication Techniques to Realize CMOS-Compatible Microfluidic Microchannels, Angela Rasmussen et al., IEEE, Journal of Microelectromechanical Systems, vol. 10, No. 2, Jun. 2001.

"Microflow Devices and Systems", Shuchi Shoji and Masayoshi Esashi, Published Oct. 1, 1994, pp. 157-171.

"Fused Quartz Substrates for Microchip Electrophoresis", Stephen C. Jacobson et al., Chemical and Analytical Sciences Division, Oak ridge National Laboratory, Analytical Chemistry, vol. 67, No. 13, Jul. 1, 1995,259-263.

"An Experimental and Theoretical Investigation of Fluid Flow and Heat Transfer in Microtubes", D. Yu, R. Warrington, Institute for Manufacturing Louisana Tech University, Ruston, Louisiana, 523-528.

"Liquid Transport in Rectangular Microchannels by Electroosomotic Pumping", Sarah Arulanandam and Dongqing Li, Department of Mechanical Engineering, University of Alberta, Canada, 14 pages.

"Convection Cooling of Microelectronic Chips", Snezana Konecbi et al., University of Texas at Arlington, Texas, 138-144.

"A Micro Fluidic System of Micro Channels with On-Site Sensors by Silicon Bulk Micromachining", Lung-Jieh Yang and Shung-wen Kang, Dept. of Mechanical Engineering, Tamkang University, 267-272.

English Translation of the Office Action (issued to Patent Application No. 093106097), 5 pages.

* cited by examiner

Time = 0

Time = Δt

Time = t$_{critical}$

Time = 0

Time = Δt

Time = $\Delta t_{equilibrium}$

TAPE-WRAPPED MULTILAYER TUBING AND METHODS FOR MAKING THE SAME

RELATED APPLICATIONS

This application claims priority under 35 U.S.C. section 119(e) of co-pending U.S. Provisional Patent Application No. 60/763,566, filed Jan. 30, 2006, and entitled "Taped-wraped Multilayer Tubing and Methods Making The Same," which is hereby incorporated by reference.

FIELD OF THE INVENTION

The present invention is related fluid transport systems to prevent fluid diffusion losses. Specifically, the present invention is related to tape-wrapped multilayer tubing for use in a liquid cooling system and a method for making the same.

BACKGROUND

Many types of fluid transport systems exist which require tubing to transport fluid between points in a system. Fluid diffusion is a problem in such systems, particularly in closed systems, whether the losses are due to water vapor transmission or the loss of the fluid components of a mixture. For example, if three components form a fluid mixture and each component has a different diffusion rate or permeability rate, then the concentration ratio of these components will shift over time due to the high diffusion rates in known tubing.

Another example of this problem arises in the field of cooling systems for electronics. Within this field there is the need to cool semiconductor chips. As this need grows it is presenting significant challenges to traditional designs. Moreover, modern high performance processors have very high heat dissipation requirements. However, the traditional cooling methods, which include fan mounted heat sinks and heat pipes, have a number of limitations. Fan mounted heat sinks often do not move air quickly enough to cool a modern processor, or do not sufficiently move hot air out of the casing holding the electronics. Similarly, heat pipes are limited in the amount of heat they can dissipate, and the distance they can move the heat from the heat source. Hence, conventional cooling techniques that use heat pipes or fan mounted heat sinks are not adequate for cooling modern electronics, such as high performance processors.

Systems that use liquid coolant are effective in cooling a semiconductor chip which generates significant heat. Such liquid cooling systems require the use of tubing to transport fluid. Examples of such cooling systems are further described in U.S. Pat. No. 7,000,684, and U.S. Provisional Patent Application No. 60/788,545, entitled "Multi-Chip Cooling", which are incorporated herein by reference. In such systems, fluid travels through tubing to dissipate heat generated by semiconductors.

In these systems, a vapor concentration gradient exists across the tubing boundary. Under cooling condition, the heated coolant dissipates through the walls of the tubing because there is a low concentration on the other side of the tubing. Diffusion continues to be driven by this gradient until substantial equilibrium is established on both sides of the inner tubing and the vapor concentration gradient becomes substantially zero.

Diffusion of vapor in a liquid cooling system is a problem, and potentially catastrophic if the system is allowed to dry up. In a liquid cooling system that uses a radiator, the loss of fluid results in a gradual loss of thermal performance. Furthermore, in a liquid cooling system where fluid is pumped, the substantial loss of fluid eventually results in overheating.

One solution to the problem of vapor loss is to use tubing that is known to have low water vapor transmission rates. An example of such tubing is metal tubing. The use of such tubing presents design challenges due to its rigid nature, the expense of metal, and the difficulty in assembly. Furthermore, any mixing of metals in such a system leads to corrosion and clogging in the tubes, pump or radiator.

What is needed is tubing with a high degree of flexibility and a very low water vapor transmission rate.

SUMMARY OF THE DISCLOSURE

Embodiments of the present invention are directed to a hybrid multilayer tube construction that combines high flexibility with a barrier to diffusion and low water vapor transmission rates. It is, therefore, an object of this invention to provide a tape-wrapped multilayer tubing that is flexible and which has an effective vapor diffusion barrier and also a method for making such tubing in a continuous and in-line process.

The multi-layer tape wrapped tubing is configured to effectively impede the diffusion of vapor and is made in a continuous in-line process. The multi-layer tape-wrapped tubing can have three distinct layers: an inner tubing layer, a diffusion barrier layer and an outer jacketing layer. The inner tubing layer comes into contact with liquid and vapor. Vapor that might ordinarily diffuse through the tubing is impeded by the diffusion barrier layer. The diffusion barrier layer is a laminate comprising a diffusion barrier film with a very low vapor diffusion rate sandwiched between layers of thermoplastic. The diffusion barrier layer is wrapped around the inner tubing one or more times. The outer jacket layer is a polymeric jacket which is able to be bonded onto the diffusion barrier layer wrapped inner tubing.

Another aspect of the invention is a method for efficiently making the multi-layer tape wrapped tubing in an in-line and continuous process. First the inner tubing and the diffusion barrier tape are guided to a wrapper apparatus. The wrapper wraps the tubing with the diffusion barrier tape and a seam is created. The diffusion barrier tape wrapped inner tubing is then guided to a sealer apparatus to seal the seam. The sealed, diffusion barrier tape wrapped inner tubing is then guided to an extruder where the outer jacket layer is extruded onto the tubing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention can be practiced without the use of these specific details.

Figure 1A:
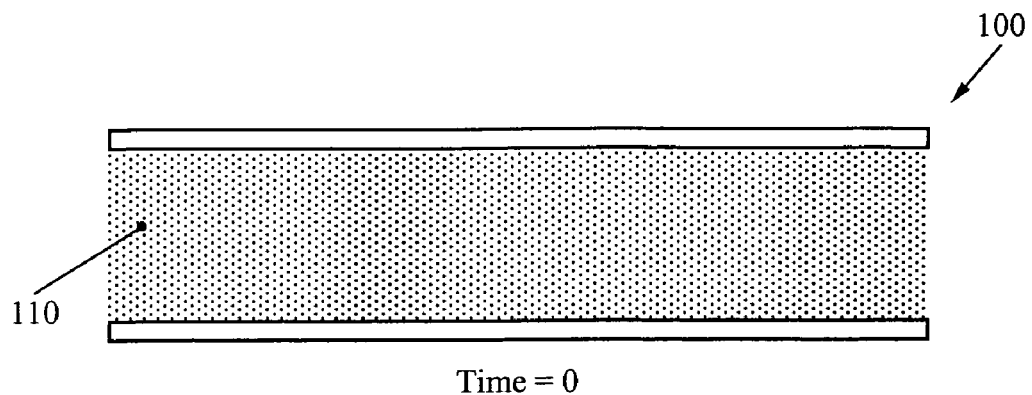
FIG. 1A illustrates the diffusion process which occurs in plastic tubing without additional diffusion barriers to vapor diffusion, beginning at time t=0.
Figure 1B:
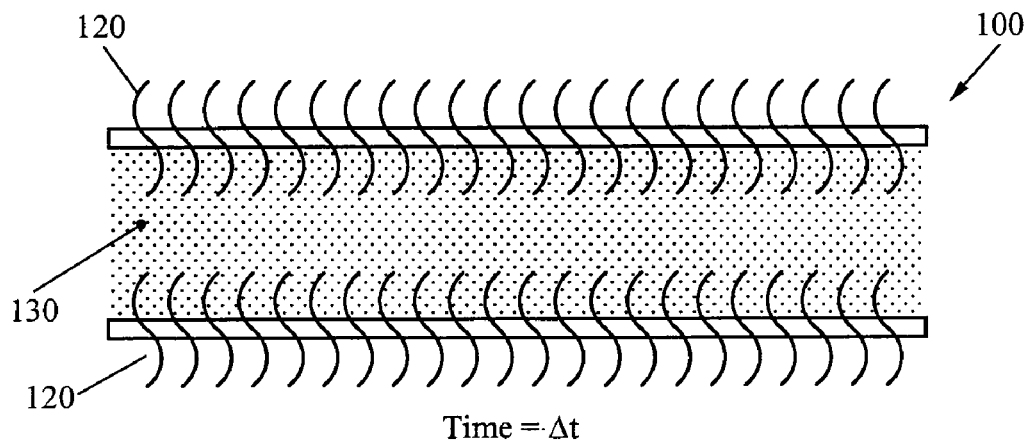
FIG. 1B illustrates the diffusion process which occurs in plastic tubing without additional diffusion barriers to vapor diffusion at time t=Δt.
Figure 1C:
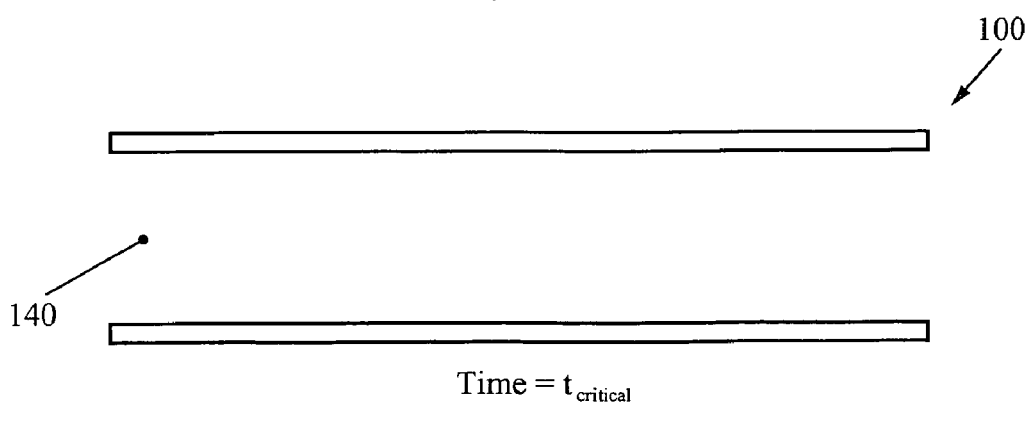
FIG. 1C illustrates the diffusion process which occurs in plastic tubing without additional diffusion barriers to vapor diffusion, at time t=$t_{critical}$.

FIGS. 1A through 1C facilitate the understanding of the invention by illustrating how liquid is lost in a cooling system using ordinary polymer tubing due to diffusion of vapor. FIG. 1A shows a polymer tube 100 filled with some original amount of vapor 110 at time (t)=0. The vapor 110 is 100% of the original water vapor in the system.

FIG. 1B represents the same polymer tube 100 at some later time t=Δt after time (t)=0. At time t=Δt, some vapor has diffused through the polymer tube walls because there is a higher concentration of vapor inside the tube than outside the tube. The diffused particles 120 escape the system. When this occurs, the amount of vapor 130 in the polymer tube 100 is less than the original amount of vapor 110. FIG. 1C illustrates the same polymer tube 100 at time $t=t_{critical}$. At time $t=t_{critical}$, almost all of the vapor in the polymer tube 100 has diffused through the tube walls. The tube ends up with a vapor concentration 140 equal to the outside concentration.

Figure 2A:
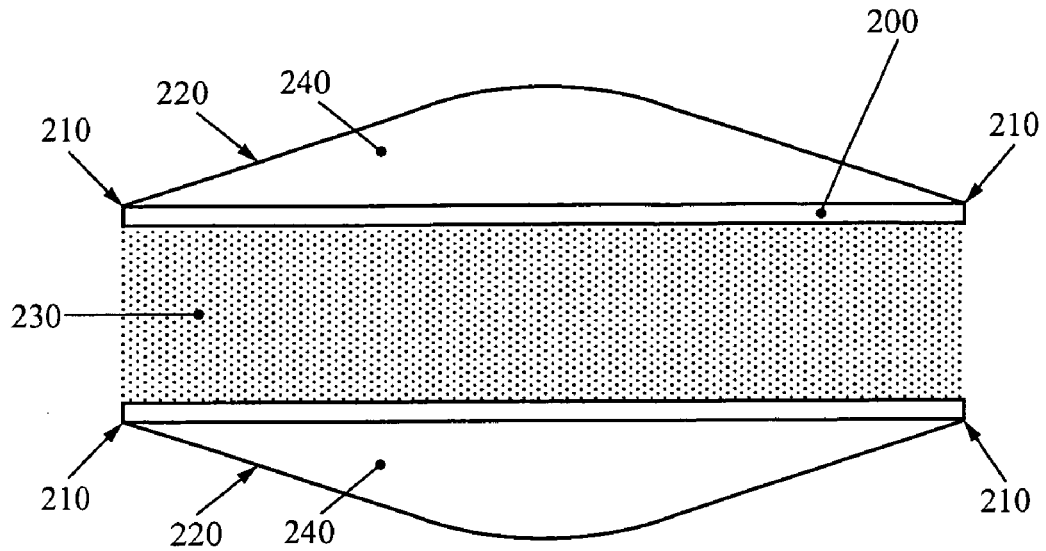
FIG. 2A illustrates the diffusion process which occurs with a diffusion barrier layer beginning at time t=0.
Figure 2B:
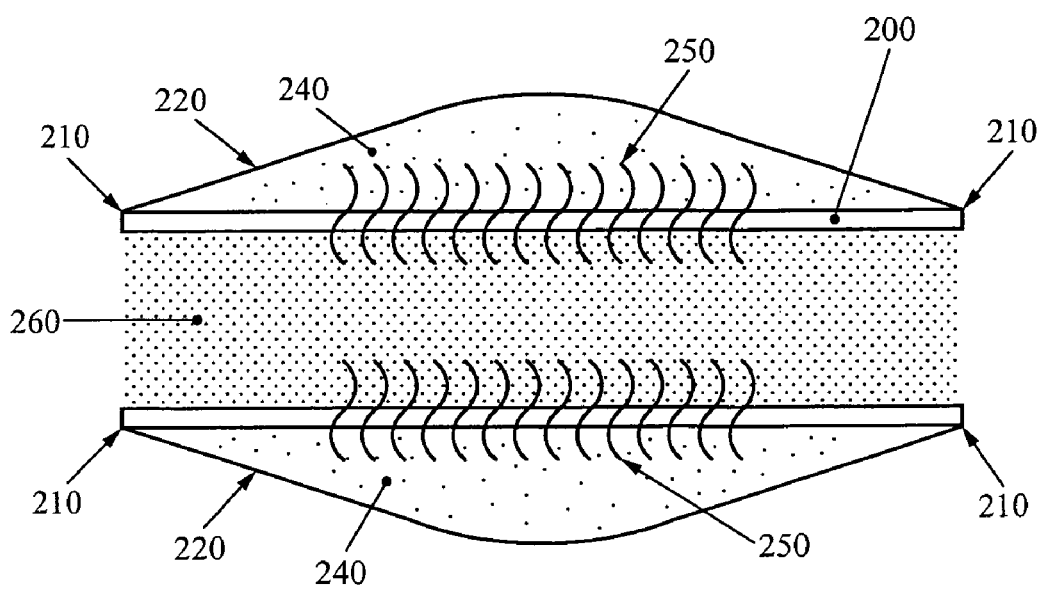
FIG. 2B illustrates the diffusion process which occurs with a diffusion barrier layer at time t=Δt.
Figure 2C:
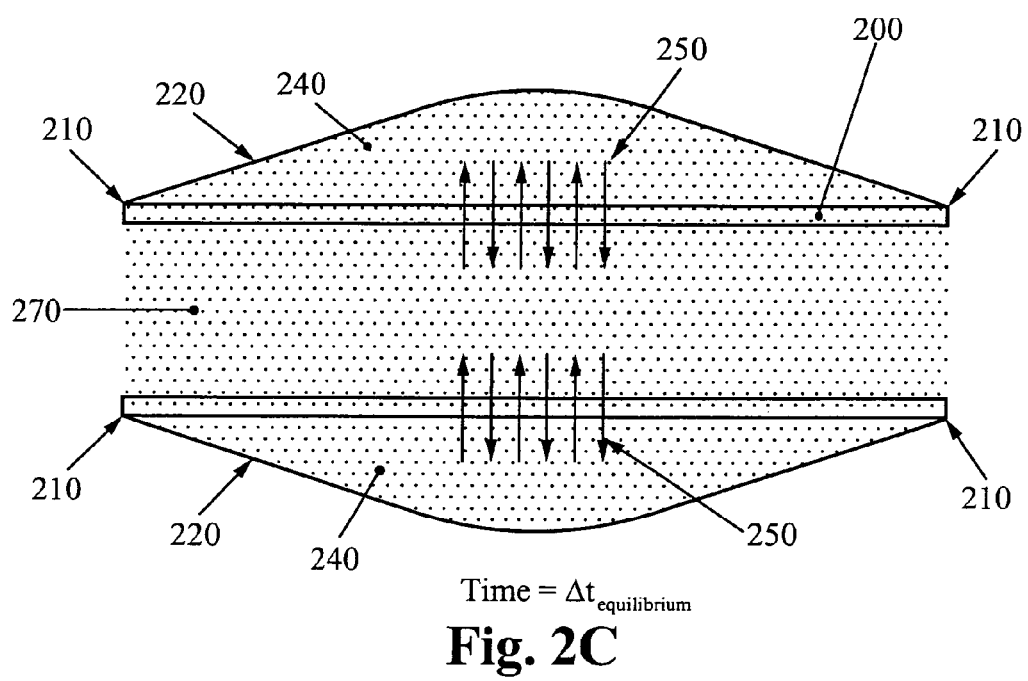
FIG. 2C illustrates the diffusion process which occurs with a diffusion barrier layer at time $t=t_{equilibrium}$.

FIGS. 2A through 2C facilitate the understanding of the invention by illustrating how using a diffusion barrier achieves a desirable solution to the vapor diffusion problem for diffusable tubing in a cooling system. FIGS. 2A through 2C illustrate a system where a polymer tube 200 is enclosed within a diffusion barrier layer 220 with substantially hermetic seal points 210. In one embodiment of the present invention, this diffusion barrier layer 220 is a multiple layer tape laminate as shown in FIG. 4.

FIG. 2A illustrates the polymer tube 200 at time (t)=0. In FIG. 2A, the polymer tube 200 is filled with some original amount of vapor 230 and the diffusion barrier enclosure regions 240 are empty. The vapor 230 is 100% of the original water vapor in the system.

FIG. 2B represents the same polymer tube 200 at some later time t=Δt after time (t)=0. At time t=Δt, some vapor has diffused through the polymer tube walls because there is a higher concentration of vapor inside the tube than outside the tube. The diffused particles 250 escape the tube 200. When this occurs, the amount of vapor 260 in the polymer tube 200 is less than the original amount of vapor 230. Correspondingly, the amount of vapor in the diffusion barrier enclosure regions 240 increases because the diffusion barrier layer has very low vapor transfer rate and traps vapor between the plastic tubing 200 and the diffusion barrier layer 220.

FIG. 2C illustrates the same polymer tube 200 at time $t=t_{equilibrium}$. At time $T=t_{equilibrium}$, the necessary amount of diffused particles 250 have diffused into the diffusion barrier enclosure regions 240 to equal the amount of vapor 270 in the inside of the polymer tube 200. At time $t=t_{equilibrium}$, the vapor concentration gradient between the diffusion barrier enclosure regions 240 and the inside of the polymer tube 200 to substantially zero and an equilibrium is reached.

Figure 3:
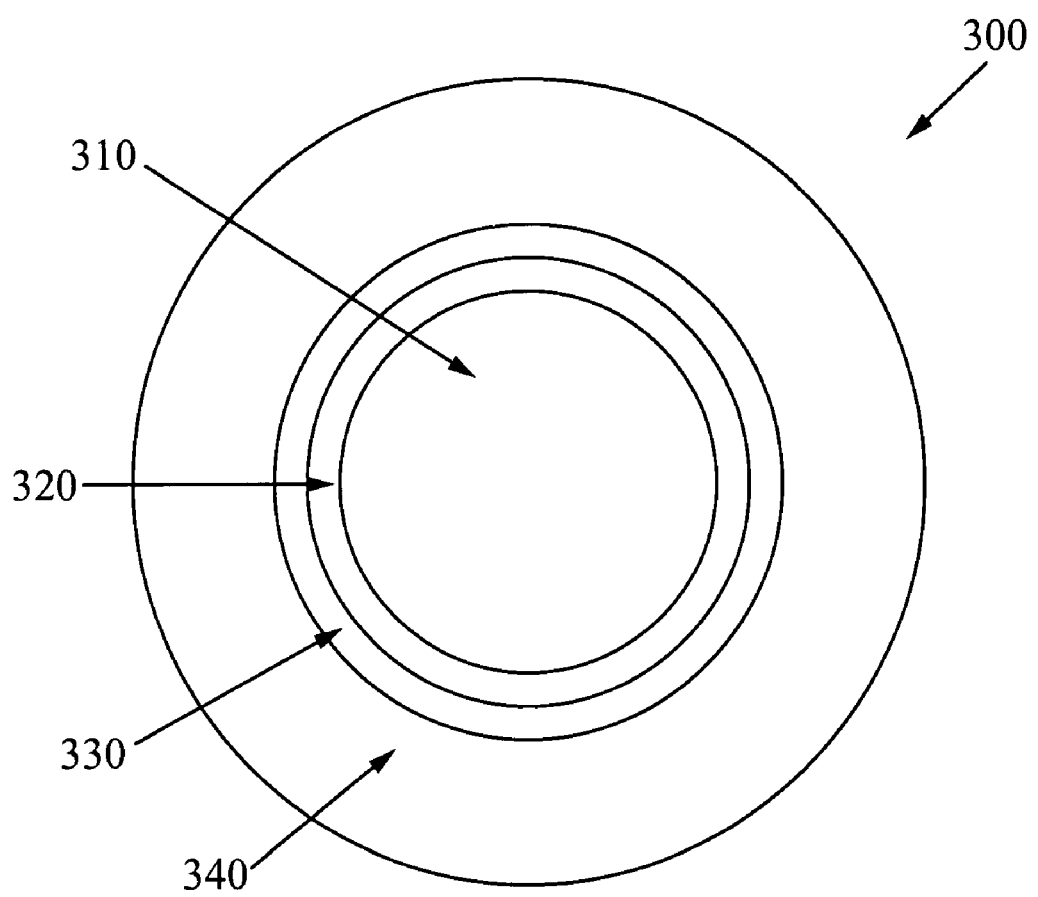
FIG. 3 illustrates the basic configuration of the multi-layer tubing of some embodiments of the present invention.

FIG. 3 illustrates one embodiment of a multi-layer tape-wrapped tubing of the present invention. Region 310 is an empty cavity where the liquid flows in the liquid cooling system. An inner tubing layer 320 is a flexible tubing which comes into contact with the fluid being transferred through the region 310. Preferably the inner tubing 320 is substantially cylindrical, however other configurations are contemplated. Some preferred characteristics for the inner tubing layer 320 include, but are not limited to the following: excellent flexibility, kinking resistance, inertness, thermomechanical and dimensional stability during the extrusion processes, and ease of coupling to connectors for leak free joints. Depending on the application, many classes of tubing are potential candidates for the inner tubing layer including, but are not limited to: (1) thermoplastics such as polyolefins, modified polyolefins, fluoroplastics, polyamides, polyesters, and vinyl resins, (2) thermoplastic elastomers based on olefinic, polybutadiene, polyester, styrenic, and vinyl chemistries, and (3) elastomers such as butyl, PIB, EPDM, NBR, SBR, and platinum-cured or peroxide cured silicone rubbers. Moreover, the tubing can be reinforced for improved thermomechanical and kink-resistance properties.

The diffusion barrier tape laminate layer or layers 330 provides an enclosure to confine vapor diffusion. In one embodiment, the diffusion barrier tape laminate layer or layers 330 are wrapped onto the inner tubing layer 320 and are then sealed by heat and pressure. In the preferred embodiment, the diffusion barrier layer or layers 330 are flexible and has the necessary puncture, tear and tensile strength for reliable, consistent and manufacturable wrapping and are able to create a continuous diffusion barrier for low vapor transmission rate characteristics.

Figure 4A:
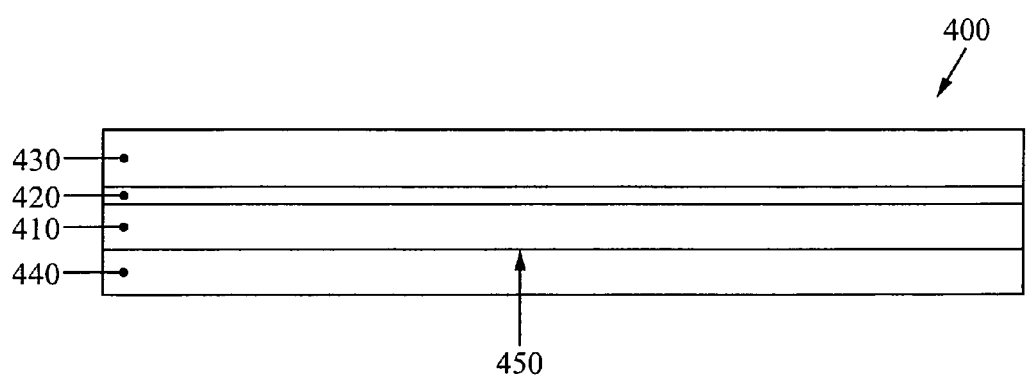
FIG. 4A illustrates one possible construction of the diffusion barrier tape layer of some embodiments of the present invention.

The present invention contemplates a variety of barrier tape laminate configurations. For example, FIG. 4A illustrates a single diffusion barrier tape laminate layer 400 of one embodiment of the present invention, where the layers are not drawn to proportional scale. In this embodiment, the single diffusion barrier layer 400 is a multiple layer tape laminate comprising a diffusion barrier material 410, thermoplastic film layers 430, 440 and an adhesive-layer 420. The diffusion barrier film 410 is highly resistant to water vapor transmission. In some embodiments, the diffusion barrier film 410 is Aluminum foil. In other embodiments, the diffusion barrier film 410 is polyamide, such as Nylon. The diffusion barrier film 410 can also be a transparent polymer such as Alcar, a polychlorotrifluoroethlylene (PCTFE) made by AlliedSignal, Saran (polyvinylidene chloride) or Tedlar (polyvinyl fluoride), both manufactured by DuPont or any other suitable material. In some embodiments of the present invention, the diffusion barrier film 410 is sandwiched between thermoplastic film layers 430, 440. These thermoplastic film layers 430, 440 act as adhesives, as they are capable of heat-sealing upon application of the proper pressure and heat. In the preferred embodiment, these thermoplastic film layers 430,400 are low density polyethylene with a low melt temperature (~120 degrees Celsius). In other embodiments, outer thermoplastic film layers 430, 440 are from the modified polyethylene family.

In some embodiments, the thermoplastic film layer 430 is adhesively bonded to the diffusion barrier film 410 via an adhesive layer 420. In some embodiments, this bonding is achieved using solvent-less adhesion laminating techniques. In some embodiments, the thermoplastic film layer 440 is bonded to the diffusion barrier film 410 by extruding the thermoplastic film layer onto the diffusion barrier film 410 at the laminate layer boundary 450 using a plastic pressure extrusion coating process. In some embodiments, the diffusion barrier film 410 includes multiple layers of diffusion barrier material are sandwiched between the two layers of thermoplastic 430 and 440.

The layers of thermoplastic 430 and 440 provide a big advantage over known techniques. Using thermoplastic layers on both sides of a diffusion barrier allows the inner tube to be wrapped in a continuous and in-line process due to the ease in which the layers 430 and 440 bond to eachother when treated with appropriate heat and pressure.

Figure 4B:
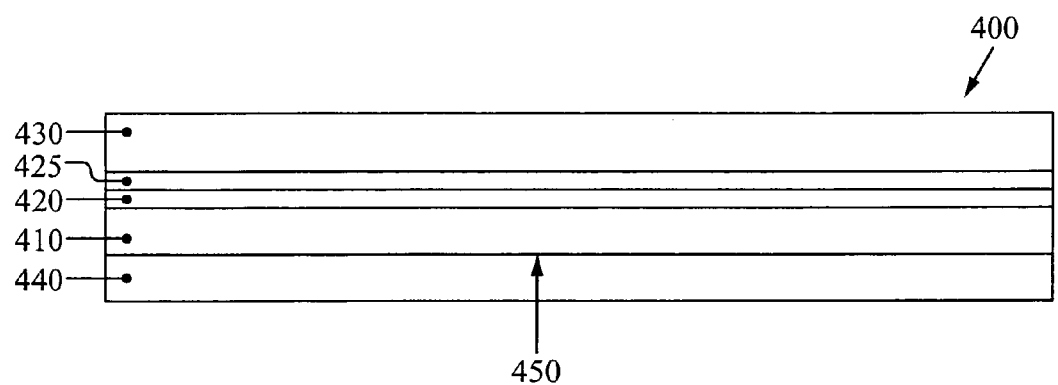
FIG. 4B illustrates another possible construction of the diffusion barrier tape layer of some embodiments of the present invention.

FIG. 4B provides an example of a preferred barrier tape laminate configuration. FIG. 4B illustrates a diffusion barrier laminate with an additional layer 425. The single diffusion barrier layer 400 is a multiple layer tape laminate comprising a diffusion barrier material 410, thermoplastic film layers 430, 440 and an adhesive-layer 420. An additional layer 425 is a polyamide layer, such as nylon. The inclusion of polyamide in the diffusion barrier tape laminate greatly improves the tear strength of the barrier film. This improvement in tear strength provides an unexpected result, which is compounded by the desired result of improving vapor diffusion. The improvement in tear strength gives the tubing better bending characteristic. The improvement in tear strength also allows the tubing to be used on barbed joints with a barb with a higher expansion ratio than normally would be possible while maintaining the integrity of the diffusion barrier.

Some embodiments of the present invention employ more than one diffusion barrier layer 400. At a penalty of reduced flexibility and a more complex construction, multiple diffusion barrier layers will provide improved puncture, tear, and tensile strength, as well as better water vapor transmission characteristics and will substantially eliminate the effect of a single faulty seal.

Referring back to FIG. 3, some embodiments of the multi-layer tape wrapped tubing include a jacket layer 340 to provide protection and integration of a substantially hermetic tubing. The thickness of the jacket layer 340 also modifies the kinking properties of the diffusion barrier tape laminate wrapped tubing 300. Modifying the thickness of the jacket layer 340 changes how much the tubing is bent before kinking impedes the flow of fluid within the tubing. In the preferred embodiment, the outer layer 340 is a polymeric jacket. The jacket layer may also have flame retardant components for better flamability characteristics for the entire multi-layer tubing composite In some embodiments, the jacket layer 340 is applied using a continuous in-line pressure extrusion process. In alternative embodiments, a tube extrusion process or a semi-pressure extrusion process is utilized. In yet another embodiment, a heat shrink process is utilized and the jacket layer 340 is applied via a heat-shrink tubing. These alternative ways of applying the jacket layer 340 have distinct manufacturing advantages, but all help to minimize the chance of a faulty seal in the diffusion barrier layer 330 due to the use of additional heat and pressure. In the preferred embodiment, additional heat and pressure from a pressure extrusion step further heat-seals the thermoplastic film layers 430, 440 (FIG. 4) to the diffusion barrier material as well as further bonding the diffusion barrier tape laminate 330 to the inner tube 320.

The jacket layer 340 also protects the underlying diffusion barrier layer 330 from punctures or tears during handling, assembly, and clamping. In some embodiments there may be a braided reinforcement layer (not shown) included between the diffusion barrier tape laminate layer 330 and the jacket layer 340 or embedded in the jacket layer 340 to improve kink resistance of the outer jacket layer. In other embodiments, multiple jacket layers (not shown) are used to further protect the inner layers. In some embodiments, the jacket has a thickness ranging from one (1) millimeter to one-half (0.5) inches.

Figure 5:
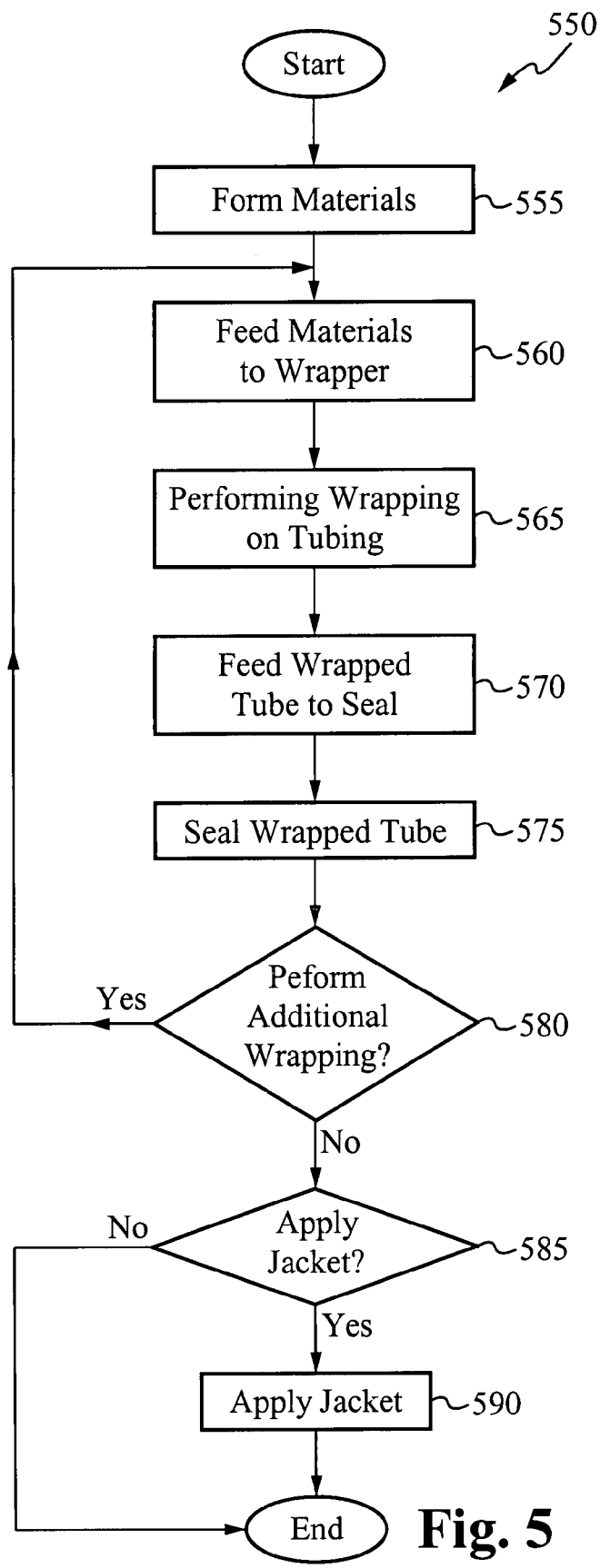
FIG. 5 is a flow chart of the basic steps of fabricating the multi-layer tubing of some embodiments of the present invention.

FIG. 5 is a flowchart showing one method of making the tape-wrapped multi-layer tubing according to some embodiments of the present invention. At step 555, the inner tubing and the diffusion barrier tape laminate are formed. In one embodiment, the inner tubing is formed by a tube extrusion process, but other ways of forming the inner tubing are contemplated. In one embodiment, the barrier tape laminate is formed by applying two layers of thermoplastic onto the diffusion barrier material in a pressure extrusion process. The thermoplastic can also be applied using a semi-pressure extrusion process. In some embodiments, an adhesive is configured between the diffusion barrier material and the thermoplastic to act as an adhesive-layer.

Other processes can similarly be used to build the layers of the present invention such as extrusion processes, calendaring or laminating. Although these specific examples are given to explain how the layer of the present invention are built up, it will be readily apparent to one skilled in the art that any other suitable process may be used.

Figure 7A:
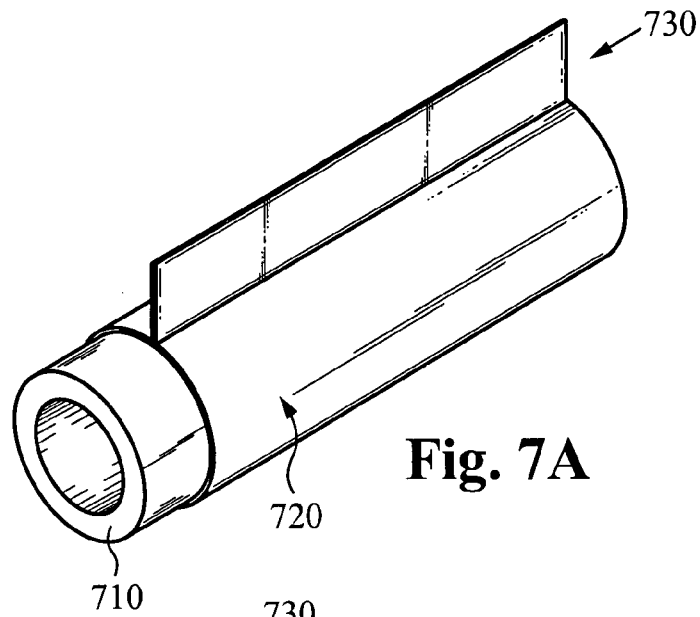
FIG. 7A is a perspective view of a flag-wrapped tube without the outer jacket before the flag is folded.
Figure 7B:
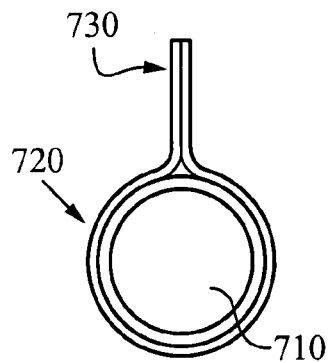
FIG. 7B is an end view of a flag-wrapped tube without outer jacket before the flag is folded.
Figure 7C:
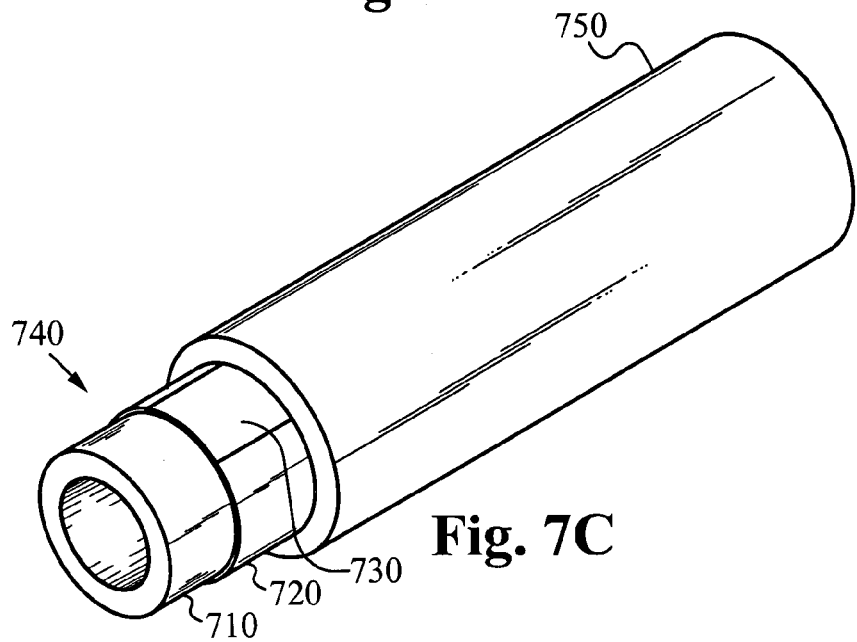
FIG. 7C is a perspective view of a flag-wrapped tube after the flag is folded and after jacketing.
Figure 8:
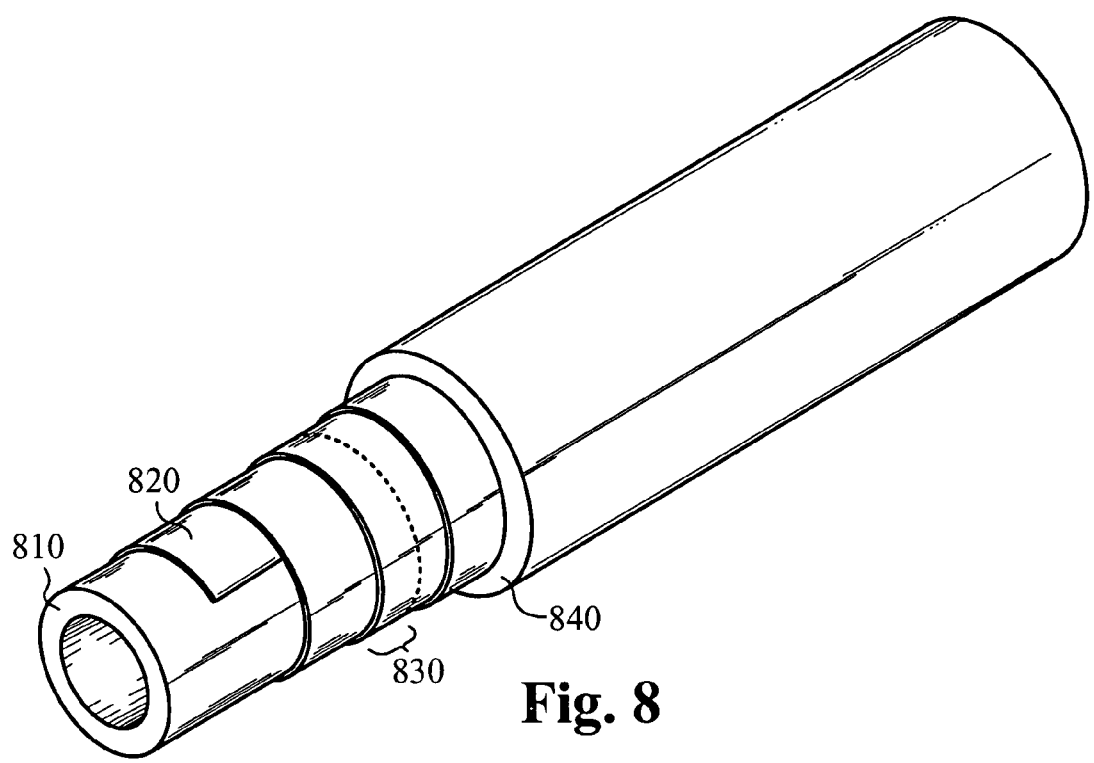
FIG. 8 is a helical-wrapped multilayer tube with the protective jacket.

Next, at the step 560, the materials are fed to a wrapper. Inner tubing that has not yet been wrapped is fed to a first wrapper. In some embodiments, previously wrapped and sealed tubing is feed to a successive wrapper or wrappers downstream from the first wrapper. In some embodiments, the wrapper is a cigarette-wrapping type wrapper as explained below in FIG. 6. In other embodiments, flag wrapping (as shown in FIGS. 7A, 7B and 7C), helical wrapping (as shown in FIG. 8), or any other appropriate wrapping is performed by the wrappers.

Next, at the step 565, the wrapper wraps a layer diffusion barrier tape laminate around the inner tubing. Alternatively, the wrapper wraps an additional layer of diffusion barrier tape laminate around an already wrapped inner tube. The wrapper wraps the tubing in such a way as to leave a seam of overlapping diffusion barrier tape laminate down substantially the length of the tubing.

At the step 570, the wrapped tubing is fed to a first sealer. At the step 575, the seam of the wrapped tubing is sealed, where the sealer applies heat and pressure to the seam. Preferably, the sealer applies enough heat and pressure to melt the thermoplastic of the diffusion barrier tape laminate, and to adhere the seam together. Using a heating temperature of approximately 120° Celsius sufficiently exceeds the softening point and is sufficient to adhere the seam.

In some embodiments of the present invention, only the adhesive layers of the seam are sealed together and the diffusion barrier tape laminate is not adhered to the inner tubing. Such an embodiment may be preferred when the inner tubing is Silicone. Silicone does not bond to the inner layer of the diffusion barrier tape laminate and therefore can slide within the diffusion barrier tape laminate when the tubing is bent. Such sliding effectively curtails tearing of the diffusion barrier tape laminate. In other embodiment the sealer applies enough heat and pressure to adhere the seam and the inner tubing to the diffusion barrier tape. In some embodiments, additional sealers, downstream from the first sealer supplies additional heat and pressure to further adhere the inner tubing to the diffusion barrier tape, and to adhere the seams together.

In some embodiments, the wrapped tubing is feed to additional wrappers and sealers downstream from the previous one at the step 580. In some embodiments, these wrappers and sealers create seams in different configurations and in different axial positions around the tubing. In other embodiments, at the step 580, the tubing is only fed through one wrapper and one sealer.

In some embodiments, a jacket layer is applied to the wrapped and sealed tubing at the step 590. Alternatively, the tubing does not have a jacket layer. In some embodiments, the jacket layer is applied using a pressure extrusion process. In other embodiments, the jacket layer is applied using a semi-pressure extrusion process. In some embodiments, the process used to apply the jacket layer to the wrapped tubing supplies additional heat and pressure to further adhere the inner tubing to the diffusion barrier tape, and to adhere the seam or seams together.

In some embodiments of the present invention, a heat-shrink process is used to apply a jacket to the tape-wrapped tubing. According to this embodiment, the inner tubing is first wrapped and sealed, either once or multiple times, in a continuous and in-line process and then separately jacketed with a heat-shrink jacket.

FIGS. 6 through 9 illustrate various methods of wrapping the diffusion barrier tape laminate around the inner tubing. Three specific methods of wrapping are disclosed herein, however, other types of wrapping are contemplated.

Figure 6:
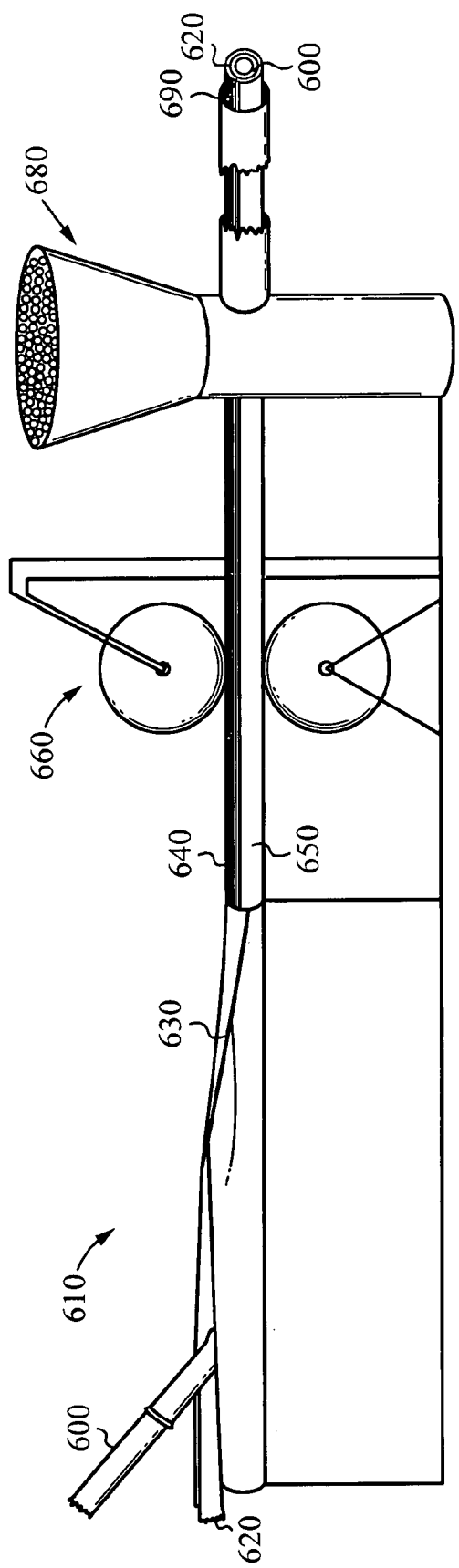
FIG. 6 illustrates the apparatus for making a cigarette-wrapped multilayer diffusion barrier tape wrapped tube with the protective jacket.

FIG. 6 illustrates the so-called "Cigarette Wrapping" wrapping method of one embodiment of the present invention. In this embodiment, the inner tubing 600 is fed to a wrapper 610 along with the diffusion barrier tape laminate 620. As explained above and in FIG. 5, the inner tubing 600 may optionally have been extruded prior to and in-line with this process. Likewise, the diffusion barrier tape laminate may be made upstream, prior to and in-line with this process. The diffusion barrier tape laminate 620 is fed through a device 630 which folds the diffusion barrier tape 620 around the inner tubing 600 as the inner tubing is guided through the wrapper 610. After being folded, an area of diffusion barrier tape laminate overlap 640 overlaps another portion of the diffusion barrier tape laminate 620. It is preferred that the overlap percentage of the diffusion barrier tape laminate range from ten percent to twenty-five percent, however any other overlap percentage is contemplated. The overlapping portions of the diffusion barrier tape laminate 620 have thermoplastic surfaces (as shown in FIG. 4 as 430 and 440) which are capable of being heat sealed together. The diffusion barrier tape laminate wrapped inner tubing 650 with an area of diffusion barrier tape laminate overlap 640 is fed to a heat sealer 660. The heat sealer 660 provides the appropriate heat and pressure to the area of diffusion barrier tape laminate overlap 640 and to the thermoplastic material that is in contact with the inner tubing so as to seal the diffusion barrier tape laminate wrapped inner tubing 650.

In one embodiment of the present invention, the wrapping and sealing process is repeated prior to jacketing to provide one or more additional layers of diffusion barrier tape laminate (not shown). In one embodiment, the one or more additional layers of diffusion barrier tape laminate is wrapped using the same method for wrapping, but could alternatively be wrapped using a different method. When the same method of wrapping is used to wrap the inner tubing 600 with multiple layers of diffusion barrier tape laminate 620, it is preferable to offset the seams to provide a greater distance between areas of diffusion barrier tape laminate overlap 640.

In one embodiment, the inner tubing 600 wrapped with at least one layer of diffusion barrier tape laminate 620 and sealed with the heat sealer 660 is guided to extruder 680 and the outer jacket layer 690 is applied. Various methods are utilized to apply the outer jacket layer 690 including, but not limited to continuous in-line pressure extrusion, tube extrusion or a semi-pressure extrusion.

FIGS. 7A through 7C illustrate the tape-wrapped multilayer tubing of the present invention when flag wrapping is utilized. This method of wrapping uses a flag wrapper (not shown) to wrap diffusion barrier tape laminate 720 around inner tubing 710. The flag 730 of the flag wrapped inner tube is subsequently folded onto the wrapped tubing and sealed. In some embodiment, the length of the flag folded down onto the wrapped tubing ranges from about one (1) millimeter to twenty (20) millimeters. A strip of sealed folded flag 730 runs the length of the wrapped inner tube. In one embodiment, the wrapping and sealing process is repeated prior to jacketing to provide one or more additional layers of diffusion barrier tape laminate (not shown). In one embodiment, the one or more additional layers of diffusion barrier tape laminate is wrapped using the same method for wrapping, but could alternatively be wrapped using a different method. FIG. 7C illustrates the sealed flag-wrapped inner tube 740 after the outer jacket layer 750 is applied.

Figure 7D:
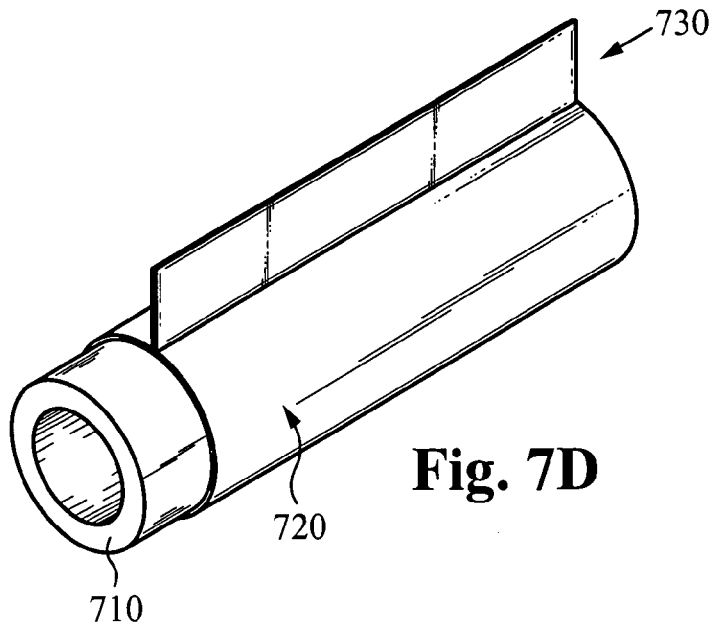
FIG. 7D is a perspective view of a flag-wrapped tube without the outer jacket before the flag is folded.
Figure 7E:
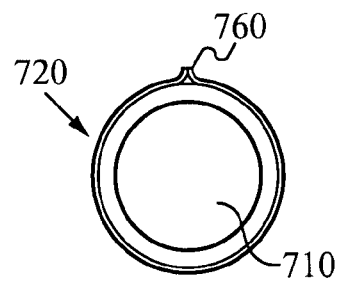
FIG. 7E is an end view of a flag-wrapped tube without the outer jacket before the flag is folded.
Figure 7F:
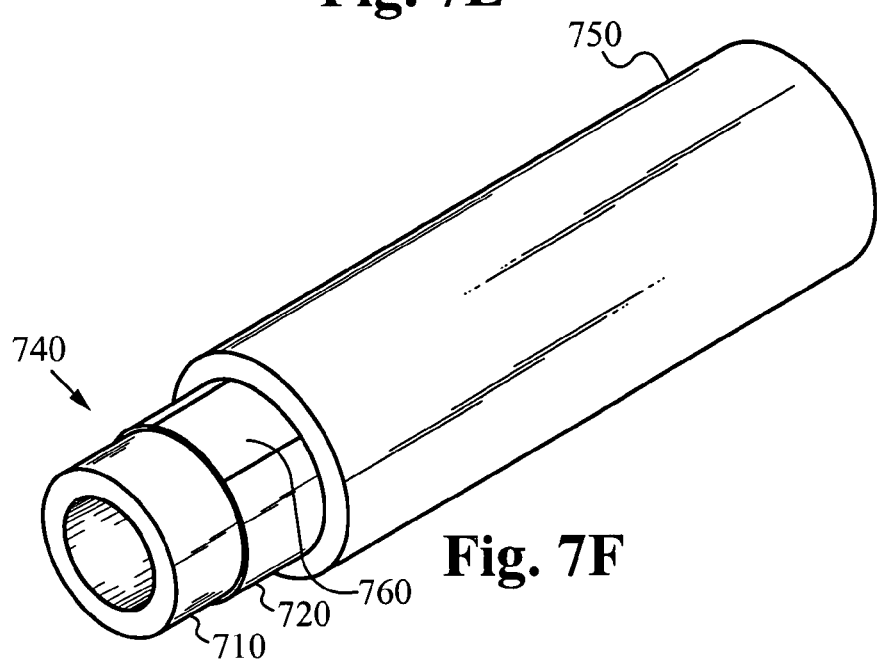
FIG. 7F is a perspective view of a flag-wrapped tube after the flag is folded and after jacketing.

In other embodiments of the present invention, in which flag-wrapping is performed, the flag is trimmed after being wrapped. FIGS. 7D, 7E and 7F illustrate the flag-wrapped tubing according to this embodiment of the present invention. As shown in 7D, diffusion barrier tape laminate 720 is wrapped around inner tubing 710. The vertically extending flag 730 of the flag wrapped inner tube is subsequently trimmed as part of the continuous, in-line process. FIG. 7E illustrates the flag-wrapped tubing after being trimmed. As shown, a small stub 760 remains and extends slightly from the inner tube 710. FIG. 7C illustrates the sealed flag-wrapped inner tube 740 after the outer jacket layer 750 is applied.

FIG. 8 illustrates the tape-wrapped multilayer tubing of the present invention when helical wrapping is utilized. This method of wrapping uses a helical wrapper (not shown) to wrap diffusion barrier tape laminate 820 around inner tubing 810. The helical wrapper wraps the diffusion barrier tape laminate 820 around the length of the inner tubing 810 in a continuous overlapping spiral. The helical wrapped diffusion barrier tape laminate forms an overlap area 830. It is preferred that the overlap percentage of the spiral wrapped diffusion barrier tape laminate range from twenty-five percent to fifty-five percent, however any other overlap percentage is contemplated. After the helical wrapped diffusion barrier tape laminate is sealed, the outer jacket layer 840 is applied.

In some embodiments of the present invention, the wrapping and sealing process is repeated prior to jacketing to provide one or more additional layers of diffusion barrier tape laminate (not shown). The additional wrapping and sealing can be applied in a continuous in-line process. Alternatively, the additional wrapping and sealing can occur sequentially, such as by spooling a taped wrapped tube and then re-feeding the previously wrapped tube through a wrapping and sealing machine, even the same machine. In some embodiments, the one or more additional layers of diffusion barrier tape laminate is wrapped using the same method for wrapping. Alternatively, the additional layers of diffusion barrier tape laminate are wrapped using a different method. In some embodiments, a first layer of diffusion barrier tape laminate is wrapped using a clockwise helical wrapping process, and additional layers of diffusion barrier tape laminate are wrapped using a counter-clockwise wrapping process, or vice versa. Also, in some embodiments, the seams formed by additional layers of wrapping are positioned at different axial positions on the inner tubing.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

What is claimed is:

1. A substantially hermetic tubing comprising:
   a. an inner tube; and
   b. a diffusion barrier tape laminate substantially hermetically coupled to the outside circumference of the inner tube for substantially the whole length of the inner tube, including:
      i. a diffusion barrier material;
      ii. a first layer of thermoplastic material applied to a first side of the diffusion barrier material;
      iii. a second layer of thermoplastic material applied to a second side of the diffusion barrier material, and;
      iv. the first layer and the second layer of thermoplastic material are sealed together;
   wherein the diffusion barrier tape laminate more than completely surrounds the circumference of the inner tube and provides a strip of overlapping diffusion barrier tape laminate parallel with the length of the inner tube, further wherein the strip of overlapping diffusion barrier tape laminate couples with underlying diffusion barrier tape laminate and seals the barrier tape laminate around the inner tubing.

2. The substantially hermetic tubing according to claim 1, wherein the inner tube is made of material selected from a set comprising polyolefins, modified polyolefins, fluoroplastics, polyamides, polyesters, vinyl resins, thermoplastic elastomers based on olefinic, polybutadiene, polyester, styrenic, and vinyl chemistries, elastomers such as butyl, PIB, EPDM, NBR, SBR, and platinum-cured silicones or peroxide cured silicone rubbers.

3. The substantially hermetic tubing according to claim 1, wherein the diffusion barrier material is polyamide.

4. The substantially hermetic tubing according to claim 1, wherein each layer of thermoplastic material is configured to provide a strong seal with the inner tube when put in contact with the inner tubing and treated with heat and pressure.

5. The substantially hermetic tubing according to claim 1, wherein the diffusion barrier tape laminate does not seal to the inner tubing, wherein the inner tubing is able to slide within the diffusion barrier tape laminate.

6. The substantially hermetic tubing according to claim 1, wherein multiple layers of diffusion barrier material are layered between the at least two layers of thermoplastic.

7. The substantially hermetic tubing according to claim 1, wherein an adhesive is used to bond a layer of thermoplastic to a layer of diffusion barrier material.

8. The substantially hermetic tubing according to claim 1, wherein the first layer of thermoplastic and the second layer of thermoplastic are extruded directly onto the diffusion barrier material using an extrusion process.

9. The substantially hermetic tubing according to claim 1, wherein the first layer of thermoplastic and the second layer of thermoplastic are extruded directly onto the diffusion barrier material using a laminate process.

10. The substantially hermetic tubing according to claim 1, wherein the first layer of thermoplastic and the second layer of thermoplastic are bonded to the diffusion barrier material using a calendering process.

11. The substantially hermetic tubing according to claim 1, wherein the layers of thermoplastic coupled to the diffusion barrier tape laminate are low density polyethylene.

12. The substantially hermetic tubing according to claim 1, further comprising a jacket layer, wherein the jacket layer covers the diffusion barrier tape laminate.

13. The substantially hermetic tubing according to claim 12, wherein the jacket layer is a polymer.

14. The substantially hermetic tubing according to claim 12, wherein the jacket layer is applied using an extrusion process.

15. The substantially hermetic tubing according to claim 12, wherein the jacket layer is applied using a heat shrink process.

16. The substantially hermetic tubing according to claim 1, wherein a thickness of the jacket ranges from one half millimeter to fifteen millimeters.

17. The substantially hermetic tubing according to claim 1, wherein an overlap percentage of the strip of overlapping diffusion barrier tape laminate parallel with the length of the inner tube ranges from about ten percent to about twenty-five percent of the circumference of the inner tube.

18. The substantially hermetic tubing according to claim 1, wherein the diffusion barrier material is aluminum foil.

19. A substantially hermetic tubing comprising:
   a. an inner tube; and
   b. a diffusion barrier tape laminate substantially hermetically coupled to the outside circumference of the inner tube for substantially the whole length of the inner tube, including:
      i. a diffusion barrier material;
      ii. a first layer of thermoplastic material applied to a first side of the diffusion barrier material;
      iii. a second layer of thermoplastic material applied to a second side of the diffusion barrier material, and;
      iv. the first layer and the second layer of thermoplastic material are sealed together;
   wherein the diffusion barrier tape laminate does not seal to the inner tubing, wherein the inner tubing is able to slide within the diffusion barrier tape laminate.

20. A substantially hermetic tubing comprising:
a. an inner tube; and
b. a diffusion barrier tape laminate substantially hermetically coupled to the outside circumference of the inner tube for substantially the whole length of the inner tube, including:
  i. a diffusion barrier material;
  ii. a first layer of thermoplastic material applied to a first side of the diffusion barrier material;
  iii. a second layer of thermoplastic material applied to a second side of the diffusion barrier material, and;
  iv. the first layer and the second layer of thermoplastic material are sealed together;
wherein the layers of thermoplastic coupled to the diffusion barrier tape are low density polyethylene.

21. A substantially hermetic tubing comprising:
a. an inner tube; and
b. a diffusion barrier tape laminate substantially hermetically coupled to the outside circumference of the inner tube for substantially the whole length of the inner tube, including:
  i. a diffusion barrier material;
  ii. a first layer of thermoplastic material applied to a first side of the diffusion barrier material;
  iii. a second layer of thermoplastic material applied to a second side of the diffusion barrier material, and;
  iv. the first layer and the second layer of thermoplastic material are sealed together;
wherein the diffusion barrier tape laminate is wider than the circumference of the inner tube, further wherein an extra width of the diffusion barrier tape laminate meets at one spot of the inner tube and extends perpendicularly therefrom, creating two perpendicularly extending flags, and further wherein a seal exists between the perpendicularly extending flags.

22. The substantially hermetic tubing according to claim 21, wherein the sealed perpendicularly extending flags are folded back down onto one side of the circumference of the inner tube.

23. The substantially hermetic tubing according to claim 22, wherein the flags range between 1 millimeter and 20 millimeters in length.

24. A substantially hermetic tubing comprising:
a. an inner tube; and
b. a diffusion barrier tape laminate substantially hermetically coupled to the outside circumference of the inner tube for substantially the whole length of the inner tube, including:
  i. a diffusion barrier material;
  ii. a first layer of thermoplastic material applied to a first side of the diffusion barrier material;
  iii. a second layer of thermoplastic material applied to a second side of the diffusion barrier material, and;
  iv. the first layer and the second layer of thermoplastic material are sealed together;
wherein the diffusion barrier tape laminate is wound in a helical fashion around the circumference of the inner tube, wherein the diffusion barrier tape partially overlaps itself as it is wound down the length of the inner tube and is configured with an overlap area, further wherein the overlapping barrier tape laminate seals the barrier tape laminate around the inner tubing, and
wherein an additional layer of diffusion barrier tape laminate is wound in the opposite direction around a once-wrapped inner tubing.

* * * * *

UNITED STATES PATENT AND TRADEMARK OFFICE
CERTIFICATE OF CORRECTION

PATENT NO. : 7,913,719 B2  
APPLICATION NO. : 11/699795  
DATED : March 29, 2011  
INVENTOR(S) : Douglas Werner et al.

Page 1 of 1

It is certified that error appears in the above-identified patent and that said Letters Patent is hereby corrected as shown below:

In the Specification

At column 3, line 53, please replace "$\Delta t$," with -- At -- so that the corresponding phrase reads -- At time t = $t_{critical}$ --.

At column 4, line 5, please replace "t = At," with -- t = $\Delta t$ -- so that the corresponding phrase reads -- later time t = $\Delta t$ after time (t) = 0. --.

Signed and Sealed this
Tenth Day of May, 2011

David J. Kappos
*Director of the United States Patent and Trademark Office*